United States Patent [19]

Kopec et al.

[11] 3,896,270

[45] July 22, 1975

[54] RINGING SIGNAL DETECTOR CIRCUIT

[75] Inventors: Thomas J. Kopec, Arlington Heights; Richard A. Morstadt, Elmhurst, both of Ill.

[73] Assignee: GTE Automatic Electric Laboratories Incorporated, Northlake, Ill.

[22] Filed: Dec. 7, 1973

[21] Appl. No.: 422,809

[52] U.S. Cl. .............................. 179/84 L; 179/84 R

[51] Int. Cl.$^2$ .............................. H04M 1/26

[58] Field of Search .... 179/84 L, 84 C, 84 R, 81 C, 179/81 R, 18 HB

[56] References Cited

UNITED STATES PATENTS

| | | | |
|---|---|---|---|
| 3,539,732 | 11/1970 | Weissenberg | 179/84 R |
| 3,688,038 | 9/1972 | Hugyecz et al. | 179/84 R |
| 3,748,391 | 7/1973 | Shaffer | 179/84 R |

*Primary Examiner*—Kathleen H. Claffy
*Assistant Examiner*—Joseph Popek
*Attorney, Agent, or Firm*—Robert J. Black

[57] ABSTRACT

A ringing signal detector circuit for use in telephone subsets which provides indication of the presence of incoming ringing signals via the illumination of a neon lamp. The circuitry provides increased sensitivity to ringing signals and prevents dial pulses and long term battery reversals from giving a false indication of the presence of ringing.

8 Claims, 1 Drawing Figure

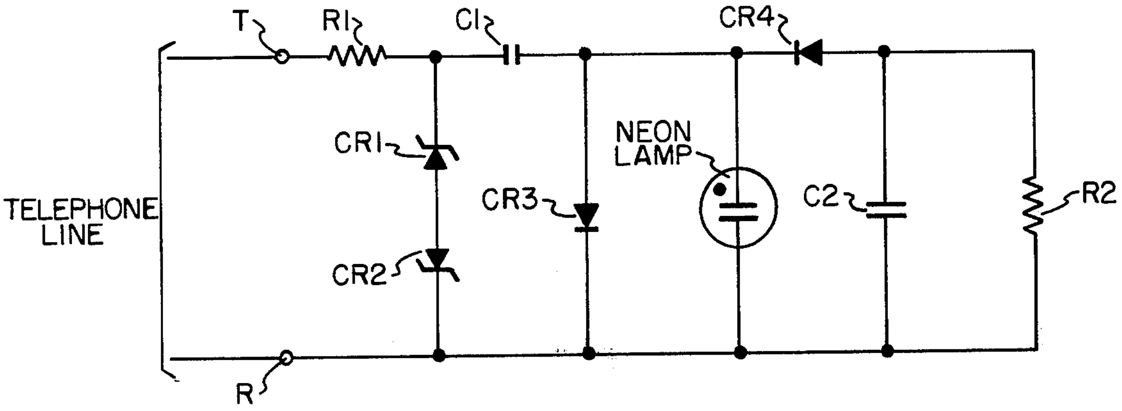
T
R1
C1
CR4
NEON LAMP
CR1
CR3
C2
R2
TELEPHONE LINE
CR2
R

RINGING SIGNAL DETECTOR CIRCUIT

BACKGROUND OF THE INVENTION

1. Field of the Invention

This invention relates to telephone subsets, and more particularly to a ringing signal indication arrangement for use in a telephone subscriber's subset.

2. Description of the Prior Art:

In the past it has been conventional to provide an indication of incoming ringing signals by placing a neon lamp and series resistor combination across the telephone line to which the telephone instrument is connected. The illumination of the neon lamp then provided a visual indication of the ringing signal, or was used to trigger a photosensitive device to give an indication of the ringing signal. This particular technique, however, is not completely successful inasmuch as the neon lamp also became illuminated in response to dial pulses.

One technique for correcting the problem of response to dial pulses was to place a resistor in series with the parallel combination of a silicon-carbide varistor in parallel with a capacitor and neon lamp in series. This particular circuit prevents flashing of the neon lamp due to dial pulses. However, because of the relatively gradual slope of the varistor current-to-voltage curve, dial pulses of sufficient energy would still cause the lamp to flash, and the neon lamp would also flash when line battery polarity was reversed. Also, in this particular arrangement the neon lamp often was not activated when relatively low level ringing signals were received.

The present invention is drawn to a ringing signal detector circuit including a neon lamp, which responds reliably to valid ringing signals, even those of relatively low level, and yet does not respond to dial pulses or long term battery reversals.

SUMMARY OF THE INVENTION

The ringing signal detector circuit of the present invention utilizes a neon lamp as a visual indicator, preceded first by a peak-limiting network connected across the telephone line, then by a voltage doubler network, and followed by a battery reversal suppression network.

The peak-limiting network serves to prevent dial pulses from causing the neon lamp to operate. The voltage doubler network serves to add the peak ringing voltage to the difference between the limited peak ringing voltage and the line battery voltage, thus providing a higher voltage to the neon lamp for its operation. The battery reversal suppression network absorbs transient energy caused by long-term battery reversals, thus preventing false operation of the neon indicator lamp.

BRIEF DESCRIPTION OF THE DRAWING

The attached drawing is a schematic circuit diagram of a ringing signal detector circuit for use in a telephone subset in accordance with the present invention.

DESCRIPTION OF THE PREFERRED EMBODIMENT

Referring now to the accompanying drawing there is shown in schematic form a ringing signal detector circuit for use in a telephone subset in accordance with the present invention.

Incoming ringing signals received over a conventional telephone line are presented at terminals T and R. The ringing signals are then supplied to a peak-limiting network through current-limiting resistor R1. The peak-limiting network consists of two zener diodes CR1 and CR2, connected as shown in the accompanying drawing, anode-to-anode or alternately cathode-to-cathode. The zener diodes are selected to have a breakdown voltage between the highest line battery voltage encountered and the minimum firing voltage of the neon lamp. In this manner the peak-limiting network limits the amplitude of the dial pulses to the zener voltage. Since the dial pulses are unipolar in nature, and are limited to the zener voltage, which is less than the minimum firing voltage of the neon lamp, the neon lamp will not light.

The incoming ringing signal is then further connected to the voltage doubler network consisting of capacitor C1 and diode CR3. If no battery voltage is applied to the telephone line, the voltage doubler network doubles the peak, or peak-limited, ringing voltage. When battery voltage is applied to the line, the voltage doubler network serves to add the peak ringing voltage to the difference between the limited peak ringing voltage and the line battery voltage. In either case, the voltage supplied to the neon lamp is substantially higher than the peak ringing voltage, thus increasing the sensitivity of the present detector circuitry.

The network used to suppress the effect of long term battery reversals consists of diode CR4, capacitor C2, and resistor R2. When a line battery polarity reversal occurs, which would normally cause the neon lamp to flash when the suppression network is not in use, capacitor C2 will absorb some of the transient energy applied to capacitor C1. The value of capacitor C2 is chosen so that capacitor C2 is charged to a voltage lower than the firing voltage of the neon lamp. Resistor R2 is then used to dissipate the charge on capacitor C2. The time constant of capacitor C2 and resistor R2 is large compared to the period of the ringing signal frequency, but small compared to the frequency of occurrence of line battery polarity reversals. In this manner the response of the neon lamp is valid to ringing signals, but is not significantly delayed, while response to long term line battery polarity reversals is completely eliminated.

While but a single embodiment of the present invention has been shown it will be obvious to those skilled in the art that numerous modifications may be made without departing from the spirit and scope of the present invention which shall be limited only by the claims appended hereto.

What is claimed is:

1. A ringing signal detector circuit connected to a telephone line, said line including a pair of line conductors subject to the impression thereon of dial pulses and line voltage, said line voltage polarity being reversable, said ringing signal detector circuit operable in response to ringing signals received over said line, said detector circuit comprising: a neon lamp; a peak-limiting network connected between said lamp and said line, operable to prevent operation of said lamp in response to dial pulses; a voltage doubler network connected between said peak-limiting network and said lamp, operated in response to said ringing signals to operate said lamp; and a battery reversal suppressor network connected to said line in parallel with said lamp, operable to absorb transient energy caused by reversal of the polarity of said line voltage impressed on said telephone line.

2. A ringing signal detector circuit as claimed in claim 1 wherein: said peak limiting network comprises a pair of zener diodes serially connected across said telephone line.

3. A ringing signal detector circuit as claimed in claim 2 wherein: said zener diodes are selected to have a breakdown voltage between line voltage present on said line and the firing voltage of said neon lamp.

4. A ringing signal detector circuit as claimed in claim 2 wherein: each of said zener diodes includes an anode and a cathode; the anodes of each of said zener diodes connected together and the cathodes of each of said diodes connected to a different line conductor of said telephone line.

5. A ringing signal detector circuit as claimed in claim 2 wherein; each of said zener diodes includes an anode and a cathode; the cathodes of each of said zener diodes connected together and the anodes of each of said diodes connected to different conductors of said telephone lines.

6. A ringing signal detector circuit as claimed in claim 1 wherein: said voltage doubler network comprises a capacitor connected in series with said telephone line and said telephone lamp and a diode connected across said telephone line in parallel with said neon lamp.

7. A ringing signal detector circuit as claimed in claim 1 wherein: said battery reversal suppressor network comprises a diode connected in series to a resistor and capacitor in parallel, the combination of said diode, capacitor and resistor connected to said telephone line in parallel with said lamp.

8. A ringing signal detector circuit as claimed in claim 7 wherein: the value of capacitance of said capacitor is chosen so that said capacitor is charged to a voltage lower than the firing voltage of said neon lamp and the time constant of said capacitor and said resistor is large compared to the period of the frequency of said ringing signals, but small compared to the frequency of occurrence of line battery polarity reversals.

* * * * *